United States Patent [19]
Dent

[11] Patent Number: 5,239,557
[45] Date of Patent: Aug. 24, 1993

[54] DISCOUNTINUOUS CDMA RECEPTION

[75] Inventor: Paul W. Dent, Stehag, Spain

[73] Assignee: Ericsson/GE Mobile Communications, Research Triangle Park, N.C.

[21] Appl. No.: 866,555

[22] Filed: Apr. 10, 1992

[51] Int. Cl.$^5$ ............................................. H04K 1/00
[52] U.S. Cl. ....................................... 375/1; 380/34; 455/33.1; 379/61; 379/63
[58] Field of Search ............................ 375/1; 380/34; 455/33.1, 51, 57; 379/59, 61, 63; 370/18-22

[56] References Cited

U.S. PATENT DOCUMENTS

| | | | |
|---|---|---|---|
| 4,134,071 | 1/1979 | Ohnsorge | 325/42 |
| 4,293,953 | 10/1981 | Gutleber | 375/25 |
| 4,470,138 | 9/1984 | Gutleber | 375/96 |

FOREIGN PATENT DOCUMENTS 0400314 12/1990 European Pat. Off. .

OTHER PUBLICATIONS

T. Masamura, "Spread Spectrum Multiple Access System with Intrasystem Interference Cancellation", *Transations Of The Institute Of Electronics And Communication Engineers Of Japan*, Section E71, No. 3, Mar. 1, 1988, Tokyo, pp. 224-231.

Kohno et al., "Adaptive Cancellation of Interference in Direct-Sequence Spread-Spectrum Multiple Access Systems", Communications for the Information Age, *IEEE Global Telecommunications Conference*, vol. 1, Nov. 15, 1987, Tokyo, pp. 630-634.

M. K. Varanasi et al., "An Iterative Detector for Asynchronous Spread-Spectrum Multiple-Access Systems", *IEEE Global Telecommunications Conference*, vol. 1, Nov. 28, 1988, pp. 556-560.

*Database Wpil*, Week 9127, Derwent Publications Ltd., London, GB, An 91199981 & SU-A-1 605, 254, Nov. 1990.

*Primary Examiner*—Tod R. Swann
*Attorney, Agent, or Firm*—Burns, Doane, Swecker & Mathis

[57] ABSTRACT

A cellular radio telephone system employs discontinuous transmission and reception of speech signals to conserve receiver processing resources. A frame structure is imposed on digitized speech data to divide the data into units of fixed transmission time. When no active speech is present for the entire duration of a frame, transmission of that frame of data is inhibited. At the receiver, decoding of received bits is performed to determine correlation with a defined set of code words. If no correlation is found after the first few received bits of a frame, due to the absence of active speech data, decoding is discontinued for the remainder of the frame's duration. This approach frees up the receiver's resources for other tasks, such as decoding of other received signals. Frames of data from different sources are transmitted with a defined time alignment to enable the receiver to remain synchronized in the absence of transmitted data. The frames associated with different sources are staggered relative to one another, to distribute processing loads at the receiver.

35 Claims, 6 Drawing Sheets

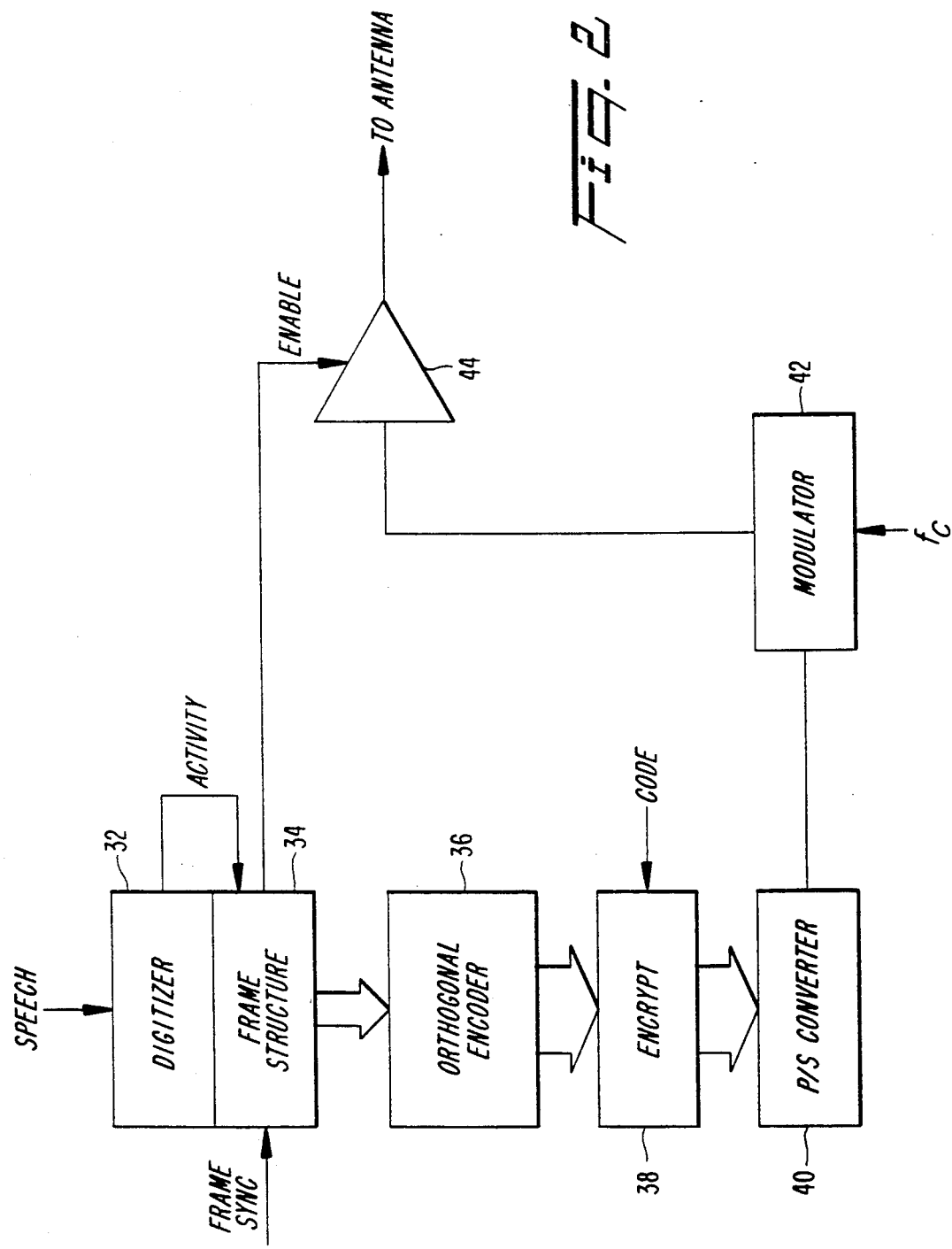

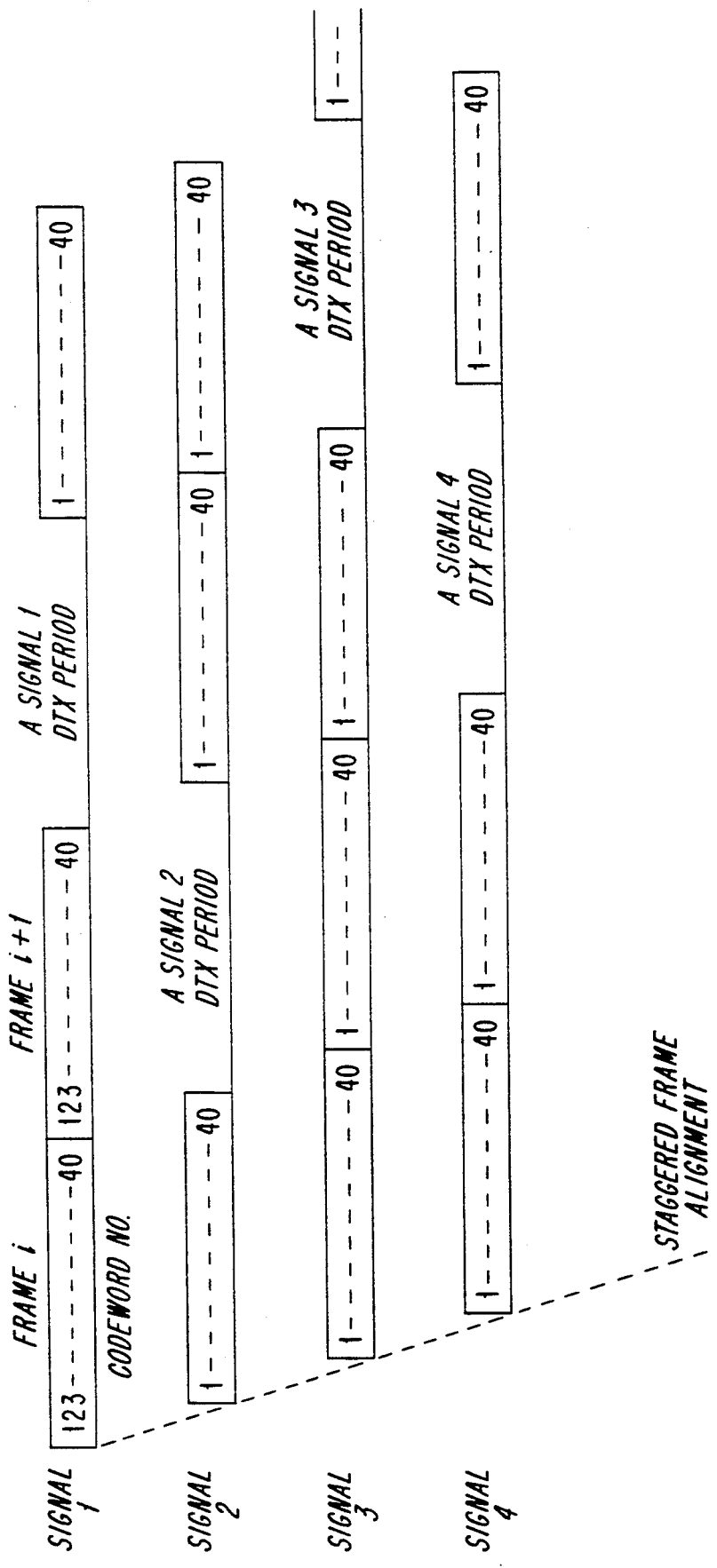

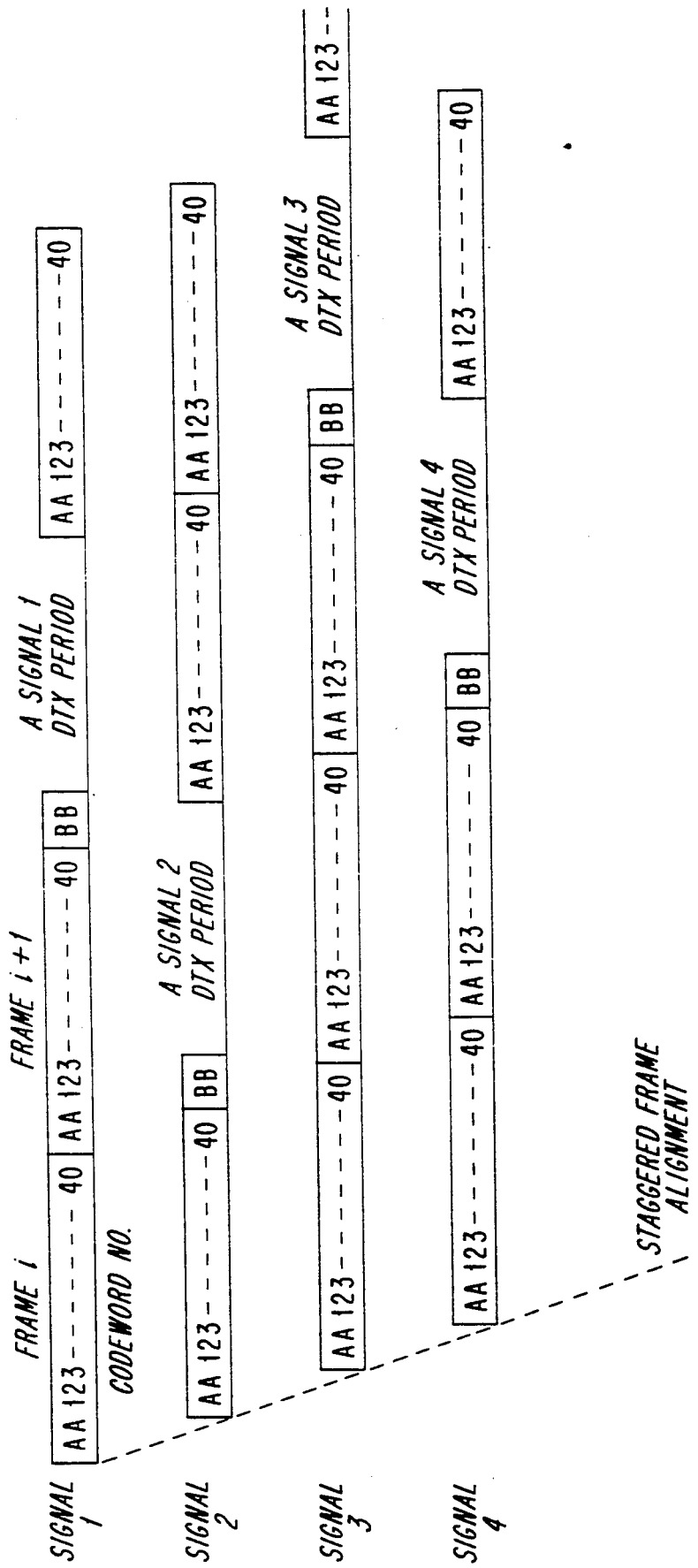

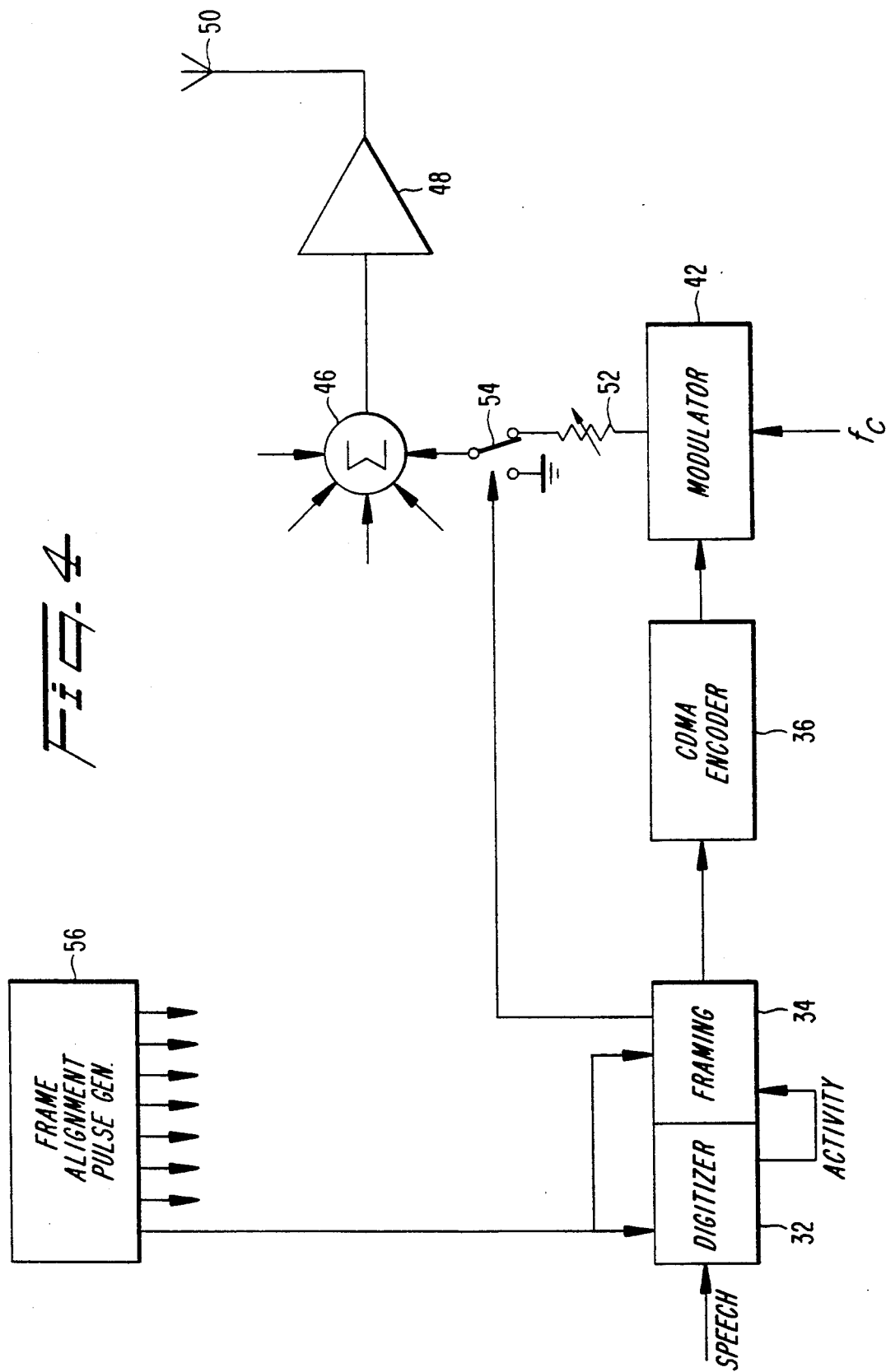

DISCOUNTINUOUS CDMA RECEPTION

BACKGROUND OF THE INVENTION

The present invention is directed to cellular radio communications systems, and more particularly to systems which employ code division multiple access (CDMA) to distinguish different communications within a cell from one another.

In a cellular radio communications system, a geographical area is divided into cells where neighboring cells are generally allocated different components of a communications parameter, to avoid interference. In early cellular systems, this communication parameter was the carrier frequency over which the communications were transmitted. Thus, to avoid interference, neighboring cells used different sets of mutually exclusive communications frequencies. Cells that were at a distance of two or more cells away from a given cell could reuse the same frequencies as the given cell. The further apart the cells reusing the same frequency were located, the lower the interference level between them.

The total number of different frequencies that are required to construct a cell pattern having an acceptable level of interference reduces the number of frequencies that are available for use within the individual cells. For example, one common cell arrangement employs a 21-cell pattern to avoid interference. In this type of arrangement, the cells are grouped in clusters of 21 contiguous cells. Each cell within a cluster must use a different set of frequencies from the other 20 cells in that cluster. If 420 frequencies are available for use within such a communications system, the number of frequencies that can be used in each cell is $420/21=20$.

With current state-of-the-art techniques, digitized voice transmission is preferred to the transmission of analog waveforms, since it is more tolerant of interference and thus permits a tighter frequency re-use pattern with consequent increase in capacity. Furthermore, with the transmission of information in digital form, each transmission frequency can be divided into time slots, with each time slot carrying a different communication. Thus, if each frequency is divided into three or four repeating timeslots, the number of communications that can be transmitted at any given time is effectively tripled or quadrupled. This approach to increasing system capacity is known as time division multiple access (TDMA).

Furthermore, when digital transmission is used, error correction coding can be employed to increase the interference tolerance. If a systematic code is employed for error correction, a number of parity bits are transmitted in addition to data bits which represent the digitized speech. More preferably, however, a non-systematic code is employed, in which all of the bits of digitized speech are converted into code words. For example, if a 128,7 block encoding technique is employed, each group of seven data bits is converted into a 128-bit code word and transmitted as such. At the receiver, each received 128-bit codeword is reconverted into the original 7-bit piece of data, e.g. speech information. Even if some of the bits of the received 128-bit codeword are erroneous, due to interference, the original data can still be easily recovered.

Unfortunately, the use of error correction coding increases the number of bits that are transmitted for each piece of information. As a result, the transmission bandwidth is widened, thereby reducing the number of frequency channels that are available without overlap. Thus, there is a tradeoff between increased interference tolerance, which permits more frequent reuse of frequencies, and a reduction in the number of frequency channels available.

At one extreme of this approach, the amount of coding that is employed is so effective that interference levels which are equal to or greater than the desired signal can be tolerated, and signal overlap can therefore be permitted. A system which operates with this approach is known as code division multiple access (CDMA). An exemplary CDMA communications system is disclosed in U.S. patent application Ser. No. 07/628,359, filed Dec. 17, 1990, and U.S. patent application Ser. No. 07/739,446, filed Aug. 2, 1991, which is a continuation-in-part application thereof. In the system disclosed in those applications, the ability to tolerate an increased number of interfering signals, to thereby achieve an increase in system capacity, is provided through the use of a subtractive demodulation process. Generally speaking, a receiver in this type of system does not operate to decode only a single desired signal in the presence of a large number of interfering signals. Rather, a number of received signals, both interfering and desired, are successively decoded in order of received signal strength. After being decoded, each interfering signal is recoded and subtracted from the received signal, to thereby reduce the interference that is present when the desired signal is decoded.

With this approach, a larger number of signals, which are differently enciphered to provide a means of discriminating them from one another, are permitted to overlap. The capacity of such a system is not limited by theoretical bounds, but rather by the amount of signal processing resources that are available to demodulate a multiplicity of signals. Accordingly, it is desirable to provide a radio communications system which affords increased system capacity in terms of the number of simultaneous communications that can be reliably transmitted and received, while at the same time minimizing receiver activity to reduce the processing requirements of the receiver.

One approach that has been used in the past to reduce the presence of interfering signals is to turn off the transmitters associated with a momentarily silent party in a two-party conversation. With this approach, the number of conversations can then be doubled before the interference reaches the original level. This technique is known as discontinuous transmission. In the past, it has been employed in non-CDMA systems, such as the time division multiple access pan-European digital cellular system, which is known as the GSM system.

A difficulty is presented when discontinuous transmission is employed in CDMA systems, however, due to the high time synchronization accuracy which must be maintained to successfully decode CDMA signals. If the transmission of a signal is interrupted for more than a short period of time, the timing of a receiver may drift to the extent that it does not immediately recognize the point at which transmission resumes. In the GSM system, the use of discontinuous transmission is facilitated by the transmission of a special code at the beginning of a transmitter shut-down period, to notify the receiver of the interruption in transmission. However, this indication is not employed to reduce the activity of the receiver. Rather, it is used to mute the audio output from the receiver during the period of no input signal from the transmitter.

U.S. Pat. No. 4,901,307 discloses a CDMA system in which the transmitter is controlled to transmit in an intermittent fashion with a variable duty factor that is contingent upon the speech activity level. In the operation of this system, the transmitter is not switched off completely during speech activity. Rather, the duty factor is established such that the transmissions take place even during periods of speech inactivity to provide enough information to maintain receiver synchronization. The purpose of this approach is to reduce the total interference level while maintaining receiver synchronization, rather than to reduce receiver signal processing resources.

SUMMARY OF THE INVENTION

The present invention provides a communications system which utilizes "discontinuous transmission" (hereinafter referred to as DTX) in a manner that enables receiver synchronization to be maintained while increasing system capacity, and is therefore particularly well suited for use in CDMA communications systems. Toward this end, according to one aspect of the present invention, a speech frame structure is deliberately imposed on the speech encoding method, even for those encoding methods which are inherently structureless. The speech signal is examined for the presence or absence of active speech. If no active speech is detected during the duration of an entire frame, the transmission of that frame of digitized speech code words is inhibited.

In another aspect of the invention, one or more codewords of a fixed value may be transmitted at the beginning of each frame to indicate to the receiver whether the remainder of the frame will be transmitted or not. As a further feature of the invention, a receiver of a CDMA signal that is transmitted pursuant to the foregoing principle attempts to demodulate that signal for a limited number of sequential code words. If the signal is not observed to reach a minimum threshold of correlation with a valid code sequence, no further attempts at demodulating that signal are carried out for the remainder of the predetermined time corresponding to the speech frame. If the receiver is of the type which receives and demodulates multiple signals, as disclosed in application Ser. Nos. 07/628,359 and 07/739,446, for example, the decoding of one of these other signals can be carried out during the remainder of the discontinuous transmission time period in which the first signal is not decoded.

Further in accordance with this aspect of the invention, the speech frame structures of a multiplicity of overlapping CDMA signals transmitted from the same base station are given a fixed relative time alignment. This alignment of the signals allows mobile receivers that are decoding at least one signal to accurately anticipate when other signals, that have been temporarily silenced through discontinuous transmission, are likely to resume transmission. Thus, receiver synchronization and frame alignment information can be obtained from signals other than the specific information signal destined for the receiver.

Preferably, the time alignment relationship employs a fixed pattern of offset between the different signals. This arrangement causes the times at which the different signals can resume transmission to be evenly distributed over the period of a speech frame. Thus, the times at which the receiver attempts to demodulate the various signals is also distributed, avoiding undesired peaks in receiver activity.

According to a further feature of the invention, the speech frame timing for transmissions from a mobile transmitter is derived from the speech frame timing of signals it receives from the base station. Thus, the relative timing that the base station chooses for transmissions from the base station to the mobile receiver is reflected in the relative frame timing between different mobile transmissions to the base station, thereby providing the base station receiver with the benefits of staggered frame alignment.

The foregoing features of the present invention, as well as the advantages provided thereby, are explained in greater detail hereinafter with reference to preferred embodiments of the invention illustrated in the accompanying drawings.

BRIEF DESCRIPTION OF THE DRAWINGS

FIG. 2 is a block diagram of a transmitter for a mobile station which operates in accordance with the principles of the present invention;

FIGS. 3A and 3B are signal diagrams illustrating the digitization and encoding of speech signals with a frame structure in accordance with the principles of the present invention;

FIG. 4 is a block diagram of a transmitter for a base station which operates in accordance with the principles of the present invention;

DESCRIPTION OF THE ILLUSTRATED EMBODIMENTS

To facilitate an understanding of the present invention, its implementation in a specific type of cellular radio telephone system is described hereinafter. The specific type of cellular radio telephone system that is described is one which operates on the basis of code division multiple access (CDMA) to differentiate various communications from one another. It will be appreciated by those having familiarity with the pertinent technology, however, that the applicability of the present invention is not limited to this particular type of system. In fact, the invention can be employed in systems which use techniques other than CDMA to distinguish various communications from one another. However, as will be appreciated from the foregoing discussion and the following description, the invention provides particularly advantageous results in a CDMA-based system, and therefore is described in that context.

To further facilitate an understanding of the invention, a specific example is described where a 128,7 orthogonal block encoding technique is employed to provide error correction and CDMA modulation. Again, however, the principles of the present invention are not limited to communications systems which employ this encoding technique.

Figure 1:
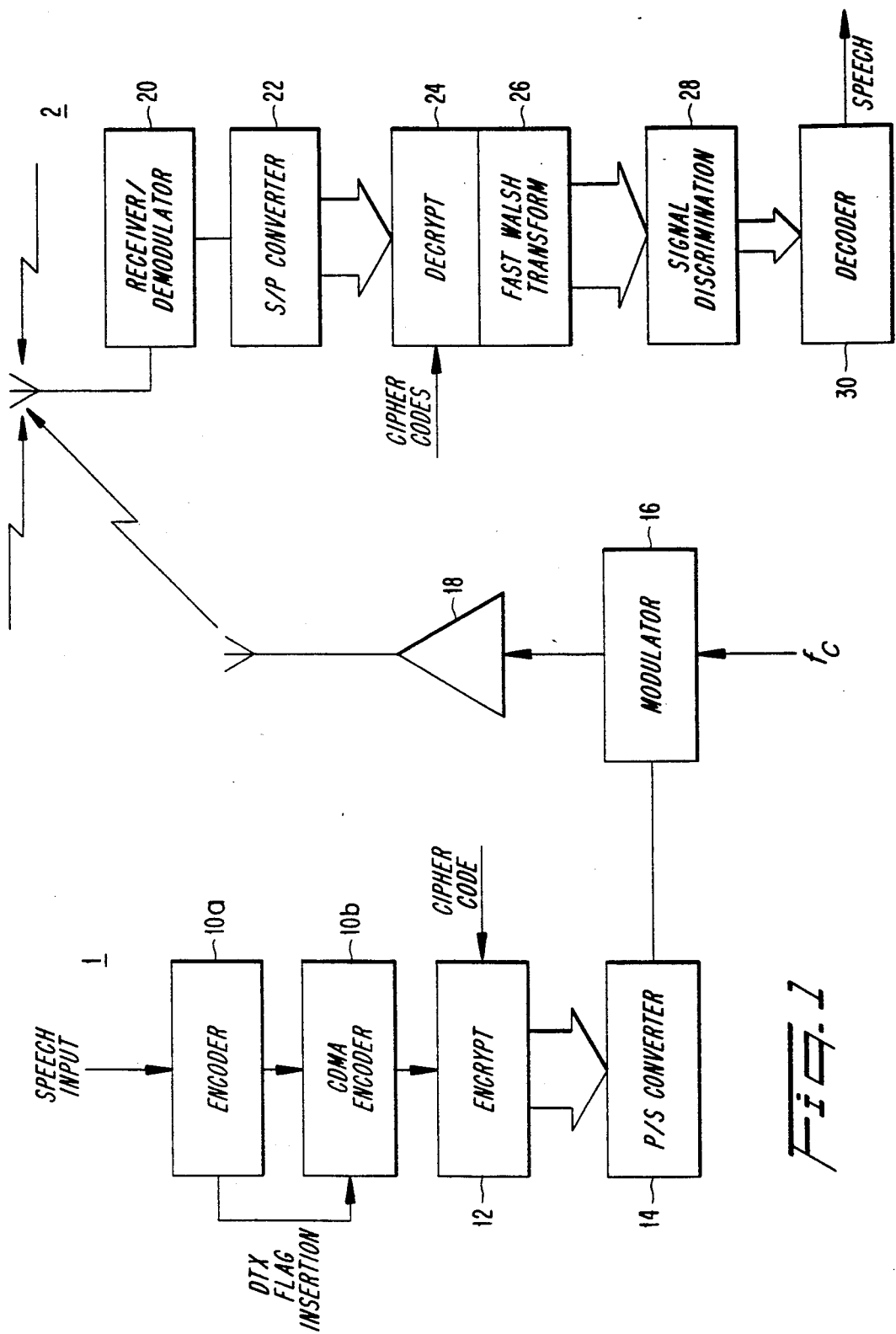
FIG. 1 is a block diagram of a CDMA communications system of a type in which the present invention can be advantageously employed.

An overall view of a CDMA-based cellular radio telephone system, of the type in which the present invention can be implemented, is illustrated in block diagram form in FIG. 1. In this view, one transmitter 1 and one receiver 2 are depicted in block form. The transmitter might be present at a base station of the radio telephone communications system, and the receiver could be located in a mobile unit, for example. Alternatively, the transmitter could be that of a mobile unit with the receiver located in a base station.

Referring to FIG. 1, speech which is generated by one of the participants in a telephone conversation is provided as an input signal to a speech encoder 10a. This speech encoder can be a conventional encoder which converts the speech signal into a digital signal according to any of the well known types of speech digitizing algorithms. Examples of such algorithms which are employed in conventional speech encoders include Continuously Variable Slope Delta Modulation (CVSD), Adaptive Delta Pulse Code Modulation (ADPCM), Residual Excited Linear Predictive Coding (RELP) and Vector Code Book Excited Linear Predictive Coding (VSELP). The particular type of encoder that is used in a given application will depend upon various design factors, such as the desired compromise between bit rate reduction and encoder cost and complexity.

After the speech signal has been digitized in the encoder 10a, its bandwidth is expanded to produce a CDMA signal in a CDMA encoder 10b. In the preferred implementation, this CDMA bandwidth expansion is obtained by means of 128, 7 orthogonal block encoding. In addition to block encoding the digitized speech signal, the encryption device 12 also scrambles the encoded signal with a unique cipher code that is assigned to the communication. The encryption can, for example, consist of the bitwise modulo-2 addition of a unique scrambling code to the block code before transmission. Since all communications preferably employ the same block codes to expand their bandwidth, the scrambling of the encoded signals with the unique cipher codes enables the various communications to be distinguished from one another, as described in greater detail in the previously mentioned copending patent applications which are incorporated by reference and in copending, commonly assigned U.S. patent application Ser. No. 07/866,865, filed on Apr. 10, 1992, entitled "Multiple Access Coding for Mobile Radio Communications".

In the preferred implementation, the speech encoder inserts two codewords designated "AA" at the beginning of non-silent frames indicating that the remaining forty speech symbols are to be transmitted. Speech frames classed as silent begin by contrast with two codewords "BB", the rest of the codewords in a frame not being transmitted. The positions of these codes, called "DTX flags" are illustrated in FIG. 3B. FIG. 3A is substantially similar to FIG. 3B except that the codewords "AA" and "BB" are not used.

Once the digitized speech signal has been encoded with the block code and scrambled with the cipher code, it is passed to a parallel-to-serial converter 14. In this circuit the encrypted speech signal is converted into a serial signal that is provided to a modulator 16. A carrier signal at a suitable carrier frequency $f_c$ is modulated with the encrypted speech signal, amplified in an amplifier 18 and transmitted to the receiver 2 of the other participant in the conversation.

At the receiver 2, which could be located in a mobile unit for example, the transmitted signal is received, demodulated to remove the carrier frequency in a demodulator 20, and reconverted to parallel form in a serial-to-parallel converter 22. The received signal is then unscrambled in a decryption circuit 24 that is provided with the same cipher code that was used to scramble the signal. Once the signal has been unscrambled, it is provided to a Fast Walsh Transform circuit 26 that determines which of the possible 128-bit orthogonal code words was transmitted. In operation, the Fast Walsh Transform circuit 26 simultaneously computes the correlation of the received code word with each possible code word, and determines the code word having the highest correlation. A suitable Fast Walsh Transform circuit is described in copending, commonly assigned U.S. patent application Ser. No. 07/735,805 filed on Jul. 25, 1991, which is expressly incorporated here by reference. This determination is carried out in a signal discrimination circuit 28. The so-discriminated code word is then provided to a speech decoder circuit 30, which converts it into the original speech signal.

In addition to the desired signal pertaining to the conversation of interest, the receiver 2 also receives signals pertaining to other conversations. For example, the receiver in a mobile unit receives signals broadcast from the base station to all of the other mobile units within the cell. In essence, these other received signals constitute noise relative to the desired signal pertaining to the conversation of interest. In a preferred implementation of the invention, these other signals are also individually decrypted and decoded, in order of their received signal strength. Once each of these "noise" signals is determined, it can then be re-encrypted and subtracted from the original received signal, to thereby reduce interfering noise and facilitate decoding of the desired signal.

The general principles of the present invention will now be described, and then the preferred embodiments of FIGS. 2–5 will be described.

The bandwidth expansion required to produce a CDMA signal can advantageously be produced with the aid of a low rate error correction code, such as orthogonal or bi-orthogonal block coding using Walsh functions. For example, a 13–16 KB/S RELP encoded speech signal can be expanded by a factor of 16 approximately to the 250–270 KB/S region by the use of a 128,7 orthogonal block code or a 128,8 bi-orthogonal block code. Such codes can be decoded very rapidly by means of a Fast Walsh Transform circuit. One such circuit has enough speed and capacity to decode 10's or 100's of such signals as envisaged in the previously identified copending patent applications.

The nature of the signal produced by a RELP encoder is a block of bits representing encoded speech parameters over a certain frame period, usually 20 mS. The signal transmitted to convey this block of information would, with the above assumption of orthogonal block coding, consist of around forty, 128-bit codewords. By the addition of DTX flags, the total number of codewords transmitted per frame becomes 42. Which of the 128 possible, 128-bit orthogonal codewords was transmitted each time may be determined with the aid of a FWT circuit that simultaneously computes the correlation with each possible codeword, and then determines the word having the highest correlation. In the adaptive, subtractive demodulator described in the previously identified copending patent applications, a number of such signals, each differently enciphered to provide a means of discriminating them one from another, are permitted to overlap, and the FWT decoder decodes them and subtracts them in an order of received signal strength that may be estimated from past history.

The capacity of such a system is in certain circumstances not limited by theoretical bounds, but by the amount of signal processing resources available to demodulate a multiplicity of signals.

The advantages of the DTX method disclosed herein is not only a halving of prevailing interference levels, but also in reducing the number of signals that the receiver is required to process at each decoding cycle. The "discontinuous receiver" (hereinafter referred to as DRX) problem for the receiver in this case is to maintain a knowledge, separately for each of the overlapping signals, of whether it has momentarily discontinued transmission and if so when it is expected to resume. This requirement is not so onerous on the fixed network side of the mobile radio telephone system, which is equipped to receive and decode all the signals, but is a burden on the mobile station which is only ultimately interested in decoding its own signal, but which must, in the system of the previously identified copending patent applications, demodulate those stronger than its own first. The DTX/DRX invention disclosed herein reduces the need to attempt demodulation of 50% of those signals that are momentarily silent, merely to discover that they are silent.

In a first aspect of the invention, a minimum time unit of DRX is instituted, for example, a whole number of 20 mS speech frames. According to the first aspect of the invention, a speech frame structure is deliberately created even if the speech coding method is inherently structureless, such as the bit-by-bit CVSD coding technique. The invention thus includes the definition of a fixed frame structure of duration equal to the chosen DTX unit even for speech coders that inherently lack a frame structure.

In a further development of the invention, a receiver of multiple CDMA signals attempts demodulation of a particular signal called the DTX flags and/or a limited number of sequential codewords, and if the signal on those occasions is not observed to reach a minimum threshold of correlation with any valid code sequence, no further attempts at demodulating that signal are made for a predetermined time commensurate with the predetermined minimum DTX time unit, i.e., until the next occasion on which the DTX flags would be expected.

In yet a further development of the invention, the speech frame structure of a multiplicity of overlapping CDMA signals transmitted by the same base station transmitter are given a fixed relative time-alignment with or without a systematic offset between the different signals, in order to allow mobile receivers that are decoding at least one signal to anticipate accurately when signals that have been temporarily silent by virtue of DTX are likely to resume transmission.

A uniformly staggered time alignment between the frame structures of different signals can be advantageously employed to evenly distribute the instants at which different signals may resume transmission, for example, by the transmission of the DTX flags for the next frame. This arrangement evenly distributes the resumption of receiver attempts to demodulate them, and undesired peaks in receiver activity are avoided.

For example, assuming that a 20 mS speech frame is transmitted as forty, 0.5 mS duration, 128-bit codewords plus two DTX flags numbered 1 to 42 relative to a first signal's speech frames and then repeating, the first signal is constrained to discontinue or resume transmission only on codeword number 1; a second signal only on codeword number 2, and so forth.

In another development of the invention, the speech frame timing of the mobile transmitter is taken from the speech frame timing it receives from the base station, so that the relative timing the base station chooses on the downlink is mirrored in the relative frame timing between different mobile transmitters on the uplink, thus providing the base receiver also with the benefits of staggered frame alignment.

Another aspect of the invention concerns the use by a mobile receiver of signal synchronization and frame alignment information on other signals than that destined for it in order to maintain synchronization with the base station during periods of DTX of the signal destined for that mobile receiver.

In FIG. 2, an embodiment of a mobile unit transmitter for implementing the principles of the present invention is illustrated in greater detail in block diagram form. FIGS. 3A and 3B illustrate the nature of the signals which are transmitted from the base station. Referring to FIGS. 2, 3A and 3B, speech that is generated at the mobile unit during a telephone conversation is input to a digitizer 32, which converts the analog speech signal into a digital signal in accordance with any suitable algorithm for doing so, such as those mentioned previously. As is conventional in many of these systems, in addition to producing a digitized speech signal, the digitizer 32 generates an output signal which indicates whether or not active speech is present at any given time. Thus, for example, during a pause in the conversation as shown in FIG. 3A, the speech activity output signal would go to a binary low state to indicate no activity.

The digitized speech signal from the digitizer 32 is preferably provided to the framing circuit 34 which imposes the predetermined frame structure on the digital speech signal. For example, each frame could be 20 milliseconds in duration. In the example described herein, a 128,7 block encoding technique is employed. Accordingly, each group of seven data bits in the digitized speech signal comprises one block Bn. Within the framing circuit 34, therefore, each frame of data could comprise 40 7-bit blocks of data, each of which is 0.5 millisecond in duration. The beginning of each frame is determined by a frame sync signal that is provided to the framing circuit 34.

Some forms of speech digitizers inherently provide a frame structure to the digitized signal. In such a case, the function of the framing circuit 34 is incorporated in the digitizer itself, and therefore does not reside as a separate element of structure. One example of a digitizer which operates in such a fashion is a RELP encoder. Other digitizers do not operate in such a fashion to inherently provide a frame structure to the digitized speech. With these types of digitizers, the framing circuit is provided to receive the digitized speech signal and divide it into frames of the predetermined length.

Once the speech signal has been digitized and divided into frames, it is provided to a CDMA modulator. This modulator can comprise an orthogonal block encoder 36 and an encryption unit 38 to scramble the block codes in a manner specific to the mobile transmitter, as described previously. Within the encoder 36 each block of 7 data bits is converted into a 128-bit codeword for transmission. The frame structure of the data is maintained within the encoder and the encryption unit, so that each transmitted frame comprises 40 128-bit codewords. The encrypted signal is converted to serial form in a parallel-to-serial converter 40 and modulated onto a radio carrier frequency in the modulator 42. The modulated signal is provided to an amplifier 44 which can be selectively disabled to inhibit transmission of the encrypted signal.

The speech activity signal from the digitizer 32 is provided to the framing circuit 34. Normally, the framing circuit 34 provides an output signal which enables the amplifier 44 to present the amplified signal to the antenna for transmission. However, if the speech activity signal indicates that no speech activity exists for a whole frame, e.g., the entire 20 millisecond duration of a frame, the enable signal to the amplifier 44 is removed to inhibit the transmission of an encrypted frame which contains no speech information. In other words, no transmission of the speech signal occurs for the duration of each frame which contains no speech information.

The present invention, therefore, includes speech activity detection at the transmitter. This can best be performed with the RELP speech coder where a better decision can be made between speech and no speech by means of a more sophisticated analysis than mere signal amplitude. For example, a change in the spectrum of the microphone signal is indicative of some acoustic event other than background noise. The speech encoder can also measure background noise levels when speech is deemed not to be present in order to set a speech/no-speech decision threshold. This decision is taken only for complete frames of the speech frame structure imposed for the purposes of the invention. The frame structure for which speech/no-speech decisions are taken may comprise one, two or more frames of a RELP coder (e.g. 1, 2 or more 20 ms periods).

The transmission or blocking of speech signals occurs over whole-frame intervals. Thus, if part of a frame contains speech information and the remainder of the frame corresponds to no speech activity, the entire frame is still transmitted. In this manner, none of the speech information is lost. It is only when the entire frame, i.e. all 40 blocks of data, lacks speech information that the transmission of the frame is blocked at the amplifier 44.

An embodiment of a transmitting unit for a base station in the mobile radio telephone system is illustrated in FIG. 4. The base station transmitter contains multiple channels, one for each communication that occurs within the cell to which the base station is assigned. In FIG. 4 one channel is illustrated, although in practice a large number of channels would be present.

Synchronization pulses, which determine the timing of the frames of digitized speech information for each channel, are generated by a frame alignment pulse generator circuit 56. The generator circuit 56 determines the relative DTX frame alignment between the different signals and preferably staggers the frame alignment as illustrated in FIGS. 3A and 3B.

In general, the structure of a single channel of the base station transmitter of FIG. 4 closely resembles a single channel of the transmitter of the mobile unit illustrated in FIG. 2. Each channel of the base station includes a digitizer 32 for digitizing a speech signal from the frame alignment pulse generator 56, a framing circuit 34 for structuring the digitized speech signal and an encoder 36 for converting the digitized speech signal into a spread signal, e.g. an orthogonal signal, and scrambling the converted signal, if appropriate. After conversion into a serial signal, the encrypted speech signal is modulated into a carrier frequency in modulator 42.

The modulated speech signal from the modulator 42 is presented to a summer 46 where it is summed with the modulated speech signals from the other channels. The summed signals are amplified in an amplifier 48 and simultaneously transmitted via an antenna 50.

Prior to being presented to the summer 46, the output signal from each modulator is individually adjusted to an appropriate level by an electronically controlled attenuator 52. The power levels of the various speech signals to be transmitted are dynamically adjusted relative to one another pursuant to suitable criteria. For example, the level of each signal can be adjusted according to signal strength or correlation magnitude measurements made by the base station receiver on signals received from corresponding mobile transmitters, in concert with information of the mobile transmitter power settings that the base station network commanded them to use.

The modulated signal also passes through an inhibit/enable switch 54 prior to presentation to the summer 46. The state of this switch is controlled by the framing circuit 34, in accordance with the speech activity signal from the digitizer 32. When speech data is present in a digitized frame, the switch 54 is placed in the enable state, illustrated in FIG. 4, so that the modulated speech signal is forwarded to the summer 46. However, when no speech activity occurs over a whole frame, the switch 54 is placed in the inhibit state for the duration of that frame. In this case, no transmission of the speech signal for that channel takes place during that frame. However, the speech signals for other channels continue to be transmitted if they contain active speech data.

In the transmitter of FIG. 4, each frame-structured signal is presented as a fixed number of symbols to the spread-spectrum encoder 36 that is preferably a low-rate, error-correction coder such as an orthogonal block encoder. A symbol is for example a 7 or 8-byte and the number of symbols in a DTX frame is for example 40. Each such symbol is converted by the orthogonal block encoder 36 to a 128-bit codeword that is then enciphered by using the code specific to that particular signal. The enciphered signal is impressed on a radio frequency carrier by modulator 42, the output level from the modulator 42 is adjusted to a desired value by the electronically controlled attenuator 52, and then passed through an inhibit/enable switch, 54, which is preferably controlled by the frame-constrained DTX signal, to the summer 46 where it is added with other, level-controlled signals before the sum is amplified to a transmit power level in the common, linear, transmit power amplifier 48. It should be pointed out that the relative level adjustment provided by the controlled attenuator 52 is preferably decided for each signal dynamically using signal strength or correlation magnitude measurements made by the base station receiver on uplink signals from the corresponding mobile transmitters, together with knowledge of the mobile transmitter power settings that the base station network signalled to them to use. The optimum strategy for such power control is disclosed in copending, commonly assigned U.S. patent application Ser. No. 07/866,554, filed on Apr. 10, 1992, entitled "Duplex Power Control".

The effect of the frame-constrained DTX control in the base station is shown in FIGS. 3A and 3B for the case of uniformly staggered frame alignment imposed by the controller or frame alignment pulse generator 56. Each signal is constrained to discontinue or resume transmission only on its own DTX frame boundaries, which have a fixed time relationship between different signals.

Figure 5:
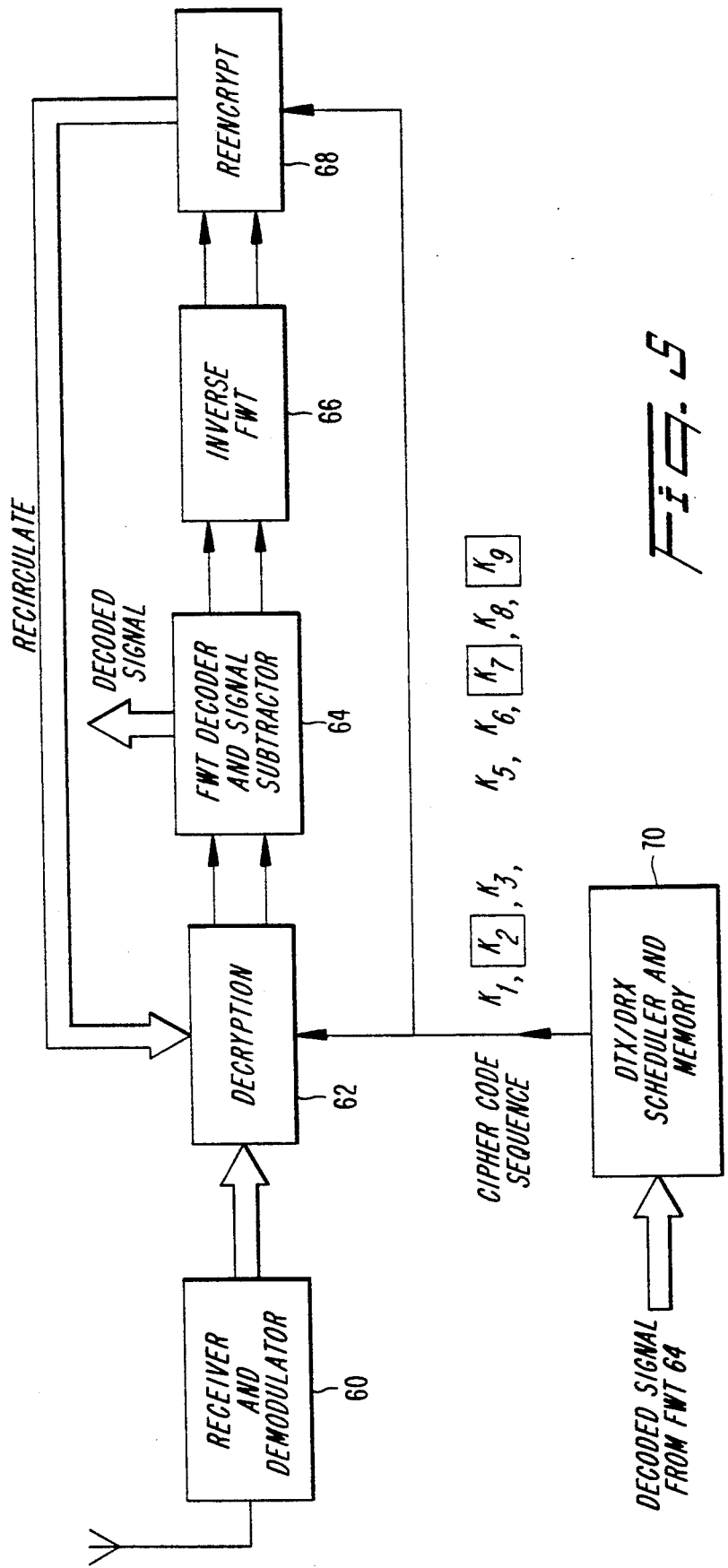
FIG. 5 is a block diagram of a receiver for discontinuous transmissions, constructed in accordance with the principles of the present invention.

The preferred arrangement of a DRX receiver adapted to take advantage of the staggered DTX frame time-alignment is shown in FIG. 5. A receiver downconvertor or demodulator 60 converts the radio frequency signal into digitized samples suitable for digital signal processing. These samples are decrypted in a decryption circuit 62 first with the cipher code belonging to the first of the multiple signals transmitted by the base station that is to be examined. This first cipher code is designated k1. After decryption, the signal samples are presented to a Fast Walsh Transform circuit 64 which determines the correlation of the samples with each of the possible codewords that could have been transmitted. That having the largest correlation is selected, and its index is the decoded symbol. The largest correlation is then set to zero to remove that signal and then the remaining correlations are inverse Fast Walsh Transformed in a circuit 66 and re-enciphered in a circuit 68 to return the residual to the original signal domain. The output signal is then applied to an exactly similar procedure adapted to the deciphering code of the next signal to be extracted. This may practically be achieved by iteratively recirculating the signal through the same circuits 62, 64, 66 and 68 again. Because of the imposed relative frame timing, the receiver is able to predict at which codeword each signal is liable to discontinue or resume transmission. When that moment arrives, the receiver examines the output of the decoder for that signal to determine if transmission has been discontinued. The decision can be based on the relative level of the correlation compared to the mean of the previous frame. If it is suspected to have discontinued transmission, the demodulated signal is not subtracted for that frame. Moreover, a DTX/DRX scheduler 70 notes that the signal is suspected to have discontinued transmission. A number of instances of low correlation may be required before the DTX/DRX scheduler 70 decides definitely that a signal has discontinued transmission, and removes it from the list of cipher codes presented to the decoder for the rest of the fixed DTX frame. The omitted k4 in the list in FIG. 5 is illustrative of such a case.

The DTX/DRX scheduler 70 is also able to predict at which codeword a particular signal is likely to resume transmission. When that moment arrives, the cipher code appropriate to that signal is re-inserted in the decoding list. If sufficiently significant correlation is achieved on one or a consecutive number of opportunities, the code is left in the list, otherwise it is removed until the start of the next frame period for that signal. Because a relatively small number of consecutive low correlation results suffices to give a reliable indication of DTX (for example 3 or 4 out of a frame of 40), the signal processing load caused by signals that have temporarily discontinued transmission is largely removed.

According to the disclosure of copending U.S. patent application Ser. Nos. 07/628,359 and 07/739,446, the signals are preferably demodulated in order of historical signal strength. Moreover, that order may be dynamically adapted as signals fade up and down relatively. The present DTX/DRX invention helps to distinguish fading of a transmission from discontinuance of a transmission. This can be done, for example, by delaying updating the signal strength history for the first few codewords of a frame, until it has been determined whether that signal has discontinued transmission or not. Moreover, the signal-strength-sorted demodulation order can be applied to help distinguish DTX from fading. For example, if at the beginning of a frame low correlation leads to a suspicion of DTX, the order of demodulation of that signal can be placed lower down the signal-strength sorted list on the subsequent decoding cycle. If the correlation was low because of fading rather than DTX, it has a chance of being observed at a lower signal level on subsequent frames, thus denying the DTX postulate and causing instead update of the signal strength history in a downward direction.

Because for each signal the above manipulations are required only once per DTX frame (i.e. 20 mS), a simple microprocessor has enough capacity to perform the necessary computations for the total number of active signals present in the decoding list. A software implementation of the DTX/DRX scheduler 70 is therefore preferable.

While the invention has been described in its preferred embodiments, it is to be understood that the words that have been used are words of description rather than of limitation, and that changes within the purview of the present claims may be made without departing from the true scope of the invention in its broader aspects.

I claim:

1. An improved transmitter for spread spectrum code division multiple access radio communication signals, having a speech digitizer for speech signals, comprising:
   means for assembling the digitized speech from the speech digitizer into fixed frames corresponding to a fixed whole number of symbols;
   means for generating an activity indication for each fixed frame containing speech activity; and
   means for inhibiting the transmitter when there is no activity and for resuming the transmitter, only at fixed frame times identified by the activity indication.

2. An improved transmitter according to claim 1, wherein the frames include a fixed number of speech symbols and each frame includes one or more known symbols which are always transmitted, the known symbols indicating to the receiver whether the rest of the frame is transmitted or not.

3. An improved transmitter according to claim 1 wherein a plurality of radio signals are added with controlled multiplying weights for transmission by a common transmitter amplifier and antenna combination, each radio signal being capable of being discontinued for a fixed frame consisting of a time period corresponding to a whole number multiple of the spread spectrum code units.

4. An improved transmitter according to claim 3 in which the fixed frames for each of said plurality of signals have a fixed time alignment with respect to each other.

5. An improved transmitter according to claim 4 in which said fixed time alignment is relatively staggered between said signals.

6. An improved receiver according to claim 5 wherein the improved receiver maintains synchronization with the transmitter during frames of discontinued transmission by demodulating a signal destined for another receiver.

7. An improved receiver for receiving spread spectrum code division multiple access radio communication signals, comprising:

means for deciding whether a transmitter has or has not discontinued transmission only at predetermined fixed frames which correspond to frames of speech symbols at the input of the speech decoder, and means, responsive to the deciding means, for causing the receiver to output a default audio signal upon deciding that there is a discontinuance of activity from the transmitter.

8. An improved receiver according to claim 7 wherein upon detecting discontinuance of a transmitted signal, the receiver does not attempt to decode that signal until the beginning of the next fixed frame associated with that signal.

9. An improved receiver according to claim 8 for simultaneously receiving multiple radio communication signals in which said signals are demodulated and decoded in units of a fixed number of spreading code symbols and in decreasing order of historically predicted relative signal strength until a desired predetermined signal is demodulated and decoded.

10. An improved receiver according to claim 9 wherein further attempts to decode a signal having a predetermined spreading code are discontinued for the remainder of said fixed number of spreading code symbols when said signal fails to reach an expected signal strength threshold.

11. An improved receiver according to claim 10 wherein the fixed frames for different signals start at different predictable times and attempts to demodulate and decode one signal do not resume at the same time as for other signals.

12. An improved receiver according to claim 7 wherein the default audio signal output upon the discontinuance of new information from the transmitter is dependent upon data received earlier from the transmitter.

13. An improved receiver according to claim 7, wherein the deciding means decides whether the transmissions discontinue or resume at the boundaries of the fixed frames.

14. An improved receiver according to claim 7, wherein the receiver decodes a new frame and ceases to decode, if after a predetermined number of symbols no signal is found, and the receiver does not resume decoding until after the beginning of the next frame which is a fixed number of symbols later.

15. An improved receiver according to claim 7, wherein known symbols are used to determine whether the receiver attempts to decode the whole frame or suspends decoding until the next frame when the known symbols are next transmitted.

16. An improved receiver according to claim 15 wherein said known transmitted symbols are used by said receiver to establish a coherent reference for demodulation.

17. An improved receiver according to claim 15 wherein said known transmitted symbols are used by said receiver to estimate the impulse response of the communications channel.

18. An improved radio communication system including an improved transmitter for spread spectrum code division multiple access radio signals, having a speech digitizer for speech signals, and an improved receiver having a speech decoder, for receiving the code division multiple access radio communication signals, wherein the improvement comprises:

means for framing the output of the speech digitizer into fixed frames corresponding to a fixed whole number of speech signals;

means for generating an activity indication for each fixed frame;

means for inhibiting transmission of said fixed frame of symbols when no activity is indicated and for resuming the transmission only for whole fixed frames identified by said activity indication;

means for deciding at the receiver whether the transmitter has or has not inhibited transmission of a fixed frame, and means, responsive to the deciding means, for causing the receiver to output a default audio signal upon deciding that transmission of a frame has been inhibited.

19. An improved communication system according to claim 18 the transmissions discontinue or resume only at the boundaries of the fixed frames.

20. An improved communications system according to claim 18 wherein the radio communication signals overlapping on the same frequency have staggered frame alignments, such that their respective instants for discontinuing or resuming transmission do not fall at the same instant, but are distributed over a frame period.

21. An improved communications system according to claim 12, wherein the radio communication signals overlap on the same frequency have staggered frame alignment, each frame having at least one known symbol, such that their respective known symbols are not transmitted at the same instant but are distributed over a frame period.

22. An improved communications system according to claim 12, wherein the improved transmitter is disposed in a cellular base station and the improved receiver is disposed in a mobile station.

23. An improved communications system according to claim 22, wherein the transmitter of the mobile station determines the time alignment of the frames for transmission based upon time alignment of frames received, from the base station transmitter.

24. An improved communications system according to claim 18, wherein the improved receiver is disposed in a cellular base station and the improved transmitter is disposed in a mobile station.

25. An improved radio communication system including an improved transmitter for transmitting radio communication signals having a speech digitizer for speech signals, and an improved receiver for receiving the radio communication signals having a speech decoder, wherein the improvement comprises:

means for framing digitized speech from the speech digitizer into fixed frames corresponding to a fixed whole number of bits;

means for generating an activity indication for each fixed frame based on speech activity;

means for discontinuing the transmitter when there is no activity indication and for resuming the transmitter only at fixed frames identified by the activity indication;

means for deciding whether the transmitter has or has not discontinued transmission only at predetermined fixed frames which correspond to frames of speech bits at the input of the speech decoder, and means, responsive to the deciding means, for causing the receiver to output a default audio signal upon deciding that there is a discontinuance of activity from the transmitter.

26. A method for communicating speech information in a cellular radio telephone system, comprising the steps of:
digitizing a speech signal and dividing the digitized signal into frames of predetermined length;
detecting whether the speech signal represents active speech;
encoding the digitized signal with a code related to the communication;
transmitting the encoded signal to a receiver;
inhibiting the transmission of a frame of the encoded signal when the portion of the speech signal associated with that frame does not represent active speech;
receiving the transmitted signal at a receiver;
decoding the received signal, relative to said communication code, at the beginning of a frame of the signal to obtain digital data;
determining whether the obtained digital data meets a minimum correlation threshold;
continuing to decode the received signal for the remainder of the frame if the digital data meets the correlation threshold; and
inhibiting the decoding of the received signal for the remainder of the frame, relative to said communication code, when the digital data does not meet the correlation threshold.

27. The method of claim 26 wherein said communication code includes a spreading code having a predetermined number of symbols, and wherein each of said frames comprises a whole number multiple of said predetermined number of symbols.

28. The method of claim 26 further including the step of resuming the decoding received signal, relative to said communication code, at the beginning of the next received frame in the signal after inhibiting said decoding for the remainder of a previous frame.

29. A method for transferring speech communication from a base station to respective mobile units in a cellular radio telephone system, comprising the steps of:
digitizing a plurality of speech signals and dividing each digitized signal into frames of predetermined length;
detecting whether each speech signal represents active speech;
encoding each digitized signal with a code related to the mobile unit for which the respective speech signal is intended;
inhibiting the transmission of each frame of each encoded signal that is not associated with active speech;
combining the encoded signals and transmitting the combined signals;
receiving the transmitted combined signals at a receiver;
decoding the received combined signal, relative to one of said communication codes, at the beginning of a frame to obtain digital data;
determining whether the obtained digital data meets a minimum correlation threshold;
continuing to decode the received signal relative to said one code for the remainder of the frame if the digital data meets the correlation threshold; and
inhibiting the decoding of the received signal for the remainder of the frame, relative to said one code, when the digital data does not meet the correlation threshold.

30. The method of claim 29 further including the step of decoding the received signal relative to a second code at the beginning of a frame of the signal associated with said second code.

31. The method of claim 29 wherein the frames of all of said digitized signals have a predetermined time alignment relative to one another.

32. The method of claim 31 wherein the frames of each respective digitized signal are offset by a predetermined amount relative to the frames of each of the other digitized signals.

33. A method for transmitting speech information in a cellular radio telephone system, comprising the steps of:
digitizing a speech signal and dividing the digitized signal into frames of predetermined length;
detecting whether the speech signal represents active speech;
encoding the digitized signal with a code related to the communication;
transmitting the encoded signal to a receiver; and
inhibiting the transmission of a complete frame of the encoded signal when the portion of the speech signal associated with that frame does not represent active speech.

34. A method for communicating speech information in a cellular radio telephone system, comprising the steps of:
digitizing a speech signal and dividing the digitized signal into frames of predetermined length;
detecting whether the speech signal represents active speech;
encoding the digitized signal with a code related to the communication;
transmitting the encoded signal to a receiver;
inhibiting the transmission of a frame of the encoded signal when the portion of the speech signal associated with that frame does not represent active speech;
receiving the transmitted signal at a receiver;
decoding the received signal, relative to said communication code, at the beginning of a frame of the signal to obtain digital data;
determining whether said digital data corresponds to a symbol indicative of speech activity indication or a no-speech indication;
continuing to decode the received signal if said digital data corresponds to a speech activity indication; and
inhibiting decoding of the received signal for the remainder of the frame if said digital data corresponds to a no-speech indication.

35. A method for transferring speech communication from a base station to respective mobile units in a cellular radio telephone system, comprising the steps of:
digitizing a plurality of speech signals and dividing each digitized signal into frames of predetermined length;
detecting whether each speech signal represents active speech;
encoding each digitized signal with a code related to the mobile unit for which the respective speech signal is intended;
inhibiting the transmission of each frame of each encoded signal that is not associated with active speech;

combining the encoded signals and transmitting the combined signals;

receiving the transmitted combined signals at a receiver;

decoding the received combined signal, relative to one of said communication codes, at the beginning of a frame to obtain digital data;

determining whether said digital data corresponds to a symbol indicative of speech activity indication or a no-speech indication;

continuing to decode the received signal if said digital data corresponds to a speech activity indication; and inhibiting decoding of the received signal for the remainder of the frame if said digital data corresponds to a no-speech indication.

* * * * *